US009043470B2

(12) United States Patent
Ma et al.

(10) Patent No.: US 9,043,470 B2
(45) Date of Patent: May 26, 2015

(54) MEMORY ALLOCATION TO STORE BROADCAST INFORMATION

(71) Applicant: Core Wireless Licensing, S.a.r.l., Luxembourg (LU)

(72) Inventors: Jian Ma, Beijing (CN); Li Han, Beijing (CN); Yuhong Li, Beijing (CN)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 192 days.

(21) Appl. No.: 13/692,851

(22) Filed: Dec. 3, 2012

(65) Prior Publication Data

US 2013/0218831 A1    Aug. 22, 2013

Related U.S. Application Data

(63) Continuation of application No. 12/234,336, filed on Sep. 19, 2008, now Pat. No. 8,341,267.

(51) Int. Cl.
| | |
|---|---|
| *G06F 15/173* | (2006.01) |
| *G06F 17/30* | (2006.01) |
| *G06F 9/50* | (2006.01) |
| *H04N 21/235* | (2011.01) |
| *H04N 21/433* | (2011.01) |
| *H04N 21/4335* | (2011.01) |
| *H04N 21/435* | (2011.01) |
| *H04N 21/61* | (2011.01) |
| *H04N 21/84* | (2011.01) |
| *G06F 12/00* | (2006.01) |
| *H04M 1/725* | (2006.01) |

(52) U.S. Cl.
CPC ........ *G06F 17/30345* (2013.01); *G06F 9/5011* (2013.01); *G06F 9/5016* (2013.01); *H04N 21/235* (2013.01); *H04N 21/4334* (2013.01); *H04N 21/4335* (2013.01); *H04N 21/435* (2013.01); *H04N 21/6125* (2013.01); *H04N 21/84* (2013.01); *H04M 1/72561* (2013.01); *Y02B 60/142* (2013.01); *G06F 2209/504* (2013.01); *G06F 2209/508* (2013.01)

(58) Field of Classification Search
CPC ............... G06F 17/30345; G06F 2209/508; G06F 2209/504; G06F 9/5016; G06F 9/5011; H04M 1/72561; H04N 21/84; H04N 21/6125; H04N 21/435; H04N 21/4335; H04N 21/4334; Y02B 60/142
USPC ............... 709/224, 226; 725/37–48; 455/453
See application file for complete search history.

(56) References Cited

U.S. PATENT DOCUMENTS

| | | | |
|---|---|---|---|
| 5,283,838 A | 2/1994 | Togawa et al. | |
| 6,425,128 B1 * | 7/2002 | Krapf et al. | ..................... 725/37 |
| 6,457,052 B1 | 9/2002 | Markowitz et al. | |
| 6,637,029 B1 * | 10/2003 | Maissel et al. | .................. 725/46 |
| 6,970,127 B2 * | 11/2005 | Rakib | ........................... 341/173 |
| 7,047,547 B2 * | 5/2006 | Alten et al. | ..................... 725/28 |
| 7,152,098 B2 | 12/2006 | Khang | |
| 7,289,515 B2 | 10/2007 | Kusumoto | |
| 7,380,262 B2 | 5/2008 | Wang et al. | |

(Continued)

*Primary Examiner* — Alina N Boutah

(57) ABSTRACT

Methods and systems for allocating memory of user terminals are disclosed. A user terminal may determine a weight for one or more categories, each category being associated with Internet information to be broadcast. The user terminal also may determine an available memory size of memory and may allocate memory to the one or more categories for storing the Internet information based on the weights and the available memory size.

7 Claims, 6 Drawing Sheets

(56) References Cited

U.S. PATENT DOCUMENTS

| | | |
|---|---|---|
| 7,725,343 B2 | 5/2010 | Johanson et al. |
| 7,729,385 B2 | 6/2010 | Muller et al. |
| 7,751,780 B2 | 7/2010 | Saidi et al. |
| 8,046,799 B2* | 10/2011 | Noble ............................ 725/52 |
| 8,464,292 B2* | 6/2013 | Xiao et al. ..................... 725/46 |
| 2001/0006403 A1 | 7/2001 | Crocitti et al. |
| 2002/0038299 A1 | 3/2002 | Zernik et al. |
| 2002/0163914 A1 | 11/2002 | Dooley |
| 2003/0159148 A1 | 8/2003 | Farineau |
| 2003/0172349 A1 | 9/2003 | Katayama et al. |
| 2004/0033777 A1* | 2/2004 | Farineau et al. ............ 455/3.02 |
| 2004/0136379 A1 | 7/2004 | Liao et al. |
| 2004/0158853 A1* | 8/2004 | Doi et al. ....................... 725/38 |
| 2005/0027681 A1 | 2/2005 | Bernstein et al. |
| 2005/0060404 A1 | 3/2005 | Ahlander et al. |
| 2005/0129042 A1 | 6/2005 | Muhonen et al. |
| 2005/0155057 A1* | 7/2005 | Wei ................................ 725/38 |
| 2005/0193413 A1* | 9/2005 | Ellis et al. ....................... 725/45 |
| 2005/0204389 A1 | 9/2005 | Proehl et al. |
| 2005/0246432 A1 | 11/2005 | Iijima et al. |
| 2005/0246732 A1* | 11/2005 | Dudkiewicz et al. ........... 725/13 |
| 2005/0256837 A1* | 11/2005 | Kira .................................. 707/1 |
| 2005/0271084 A1 | 12/2005 | Bruckman et al. |
| 2005/0283800 A1* | 12/2005 | Ellis et al. ....................... 725/40 |
| 2006/0041549 A1 | 2/2006 | Gundersen et al. |
| 2006/0092867 A1 | 5/2006 | Muller et al. |
| 2006/0106658 A1 | 5/2006 | Johanson et al. |
| 2006/0117354 A1* | 6/2006 | Schutte et al. .................. 725/78 |
| 2006/0123038 A1* | 6/2006 | Fenton et al. .................. 707/101 |
| 2006/0123097 A1 | 6/2006 | Paila et al. |
| 2006/0123099 A1 | 6/2006 | Paila et al. |
| 2006/0155764 A1* | 7/2006 | Tao ............................ 707/104.1 |
| 2006/0173614 A1* | 8/2006 | Nomura ........................ 701/210 |
| 2006/0233102 A1 | 10/2006 | Kusumoto |
| 2006/0293077 A1 | 12/2006 | Aaltonen et al. |
| 2007/0053513 A1 | 3/2007 | Hoffberg |
| 2007/0061204 A1 | 3/2007 | Ellis et al. |
| 2007/0067597 A1 | 3/2007 | Chen et al. |
| 2007/0067776 A1 | 3/2007 | McCarthy et al. |
| 2007/0117557 A1* | 5/2007 | Adjali et al. ................... 455/418 |
| 2007/0150234 A1* | 6/2007 | Wicks ............................ 702/182 |
| 2008/0039111 A1 | 2/2008 | Ahuja et al. |
| 2008/0127271 A1* | 5/2008 | Zriny et al. ..................... 725/46 |
| 2008/0155596 A1 | 6/2008 | Rosberg et al. |
| 2008/0227440 A1* | 9/2008 | Settepalli ...................... 455/418 |
| 2008/0268829 A1* | 10/2008 | Taylor et al. .................. 455/420 |
| 2008/0276275 A1* | 11/2008 | Ellis .............................. 725/39 |
| 2009/0006974 A1 | 1/2009 | Harinarayan et al. |
| 2009/0007198 A1 | 1/2009 | Lavender et al. |
| 2009/0030785 A1 | 1/2009 | Goyal et al. |
| 2009/0037526 A1 | 2/2009 | Elliott et al. |
| 2009/0125952 A1 | 5/2009 | Chen et al. |
| 2009/0240605 A1 | 9/2009 | Rukonic et al. |
| 2009/0258594 A1 | 10/2009 | Martin-Cocher et al. |
| 2010/0037321 A1 | 2/2010 | Oz et al. |
| 2011/0191163 A1* | 8/2011 | Allaire et al. .............. 705/14.39 |

* cited by examiner

Category Memory Allocations

| Category | Memory Allocation |
|---|---|
| Category 1 | 2307 MB |
| Subcategory 1.1 | 790 MB |
| Subcategory 1.2 | 1000 MB |
| Subcategory 1.3 | 517 MB |
| Category 2 | 4500 MB |
| Subcategory 2.1 | 2400 MB |
| Subcategory 2.1.1 | 1400 MB |
| Subcategory 2.1.2 | 1000 MB |
| Subcategory 2.2 | 2100 MB |
| Category 3 | 3300 MB |
| . . . | |
| Category N | 5000 MB |

FIG. 6

MEMORY ALLOCATION TO STORE BROADCAST INFORMATION

FIELD

Example embodiments of the invention generally relate to memory allocation for storing broadcast information. More specifically, example embodiments of the invention relate to allocating memory for storing broadcast Internet information.

BACKGROUND

The amount of information available on the Internet is rapidly increasing, especially in the era of web 2.0. Some estimates indicate that between the years 1996 and 2007, the fraction of the world's population that used the Internet grew from approximately 1% to approximately 22%. Irrespective of the actual percentages, trends suggest that the Internet will continue to grow. Research has confirmed, however, that there is only a small quantity of information of interest to most netizens.

Traditionally, information is transmitted in a one-to-one fashion, where a client requests the information of interest from a server. One-to-one transmission is not an efficient way to send the same information to multiple users. Moreover, the existing Internet infrastructure has poor robustness. Conventional solutions have proposed the idea of wirelessly broadcasting Internet data through a satellite or digital broadcasting system, but have not effectively addressed the issues associated with broadcasting data to a group of clients.

BRIEF SUMMARY

The following presents a simplified summary of some example embodiments of the invention in order to provide a basic understanding of some example embodiments of the invention. This summary is not an extensive overview, and is not intended to identify key or critical elements or to delineate the scope of the claims. The following summary merely presents some concepts and example embodiments in a simplified form as a prelude to the more detailed description provided below.

Convention solutions have not addressed how to efficiently allocate memory to store Internet information broadcast to a user terminal having limited storage space.

Some example embodiments of the present disclosure are directed to an apparatus, method and system for memory allocation of a user terminal that receives broadcast Internet information and for improved broadcast distribution of Internet information.

More specifically, methods, apparatus, and systems in accordance with some example embodiments of the present invention provide user terminals with efficient memory allocation. A user terminal may determine a weight for one or more categories, each category being associated with Internet information to be broadcast. The user terminal also may determine an available memory size of memory and may allocate memory to the one or more categories for storing the Internet information based on the weights and the available memory size.

A user terminal may receive information on memory requirements for one or more categories broadcast by a provider server. The user terminal may determine a weight for the one or more categories, determine an available memory size, and allocate memory to each of the one or more categories based on the memory requirements, the weights, and the available memory size.

Additionally, methods, apparatus, and systems in accordance with certain example embodiments of the present invention provide for crawling and aggregating Internet information to identify Internet information, categorizing Internet information into categories, generating a category guide to describe characteristics of each of the categories, broadcasting category guide to at least one user terminal, and broadcasting the internet information by category to the at least one user terminal in accordance with the category guide.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 6 illustrates a memory allocation example for a user terminal in accordance with one or more example embodiments of the invention.

DETAILED DESCRIPTION

In the following description of the various embodiments, reference is made to the accompanying drawings, which form a part hereof, and in which is shown by way of illustration various embodiments in which one or more example embodiments of the invention may be practiced. It is to be understood that other embodiments may be utilized and structural and functional modifications may be made without departing from the scope of the present invention.

Figure 1:
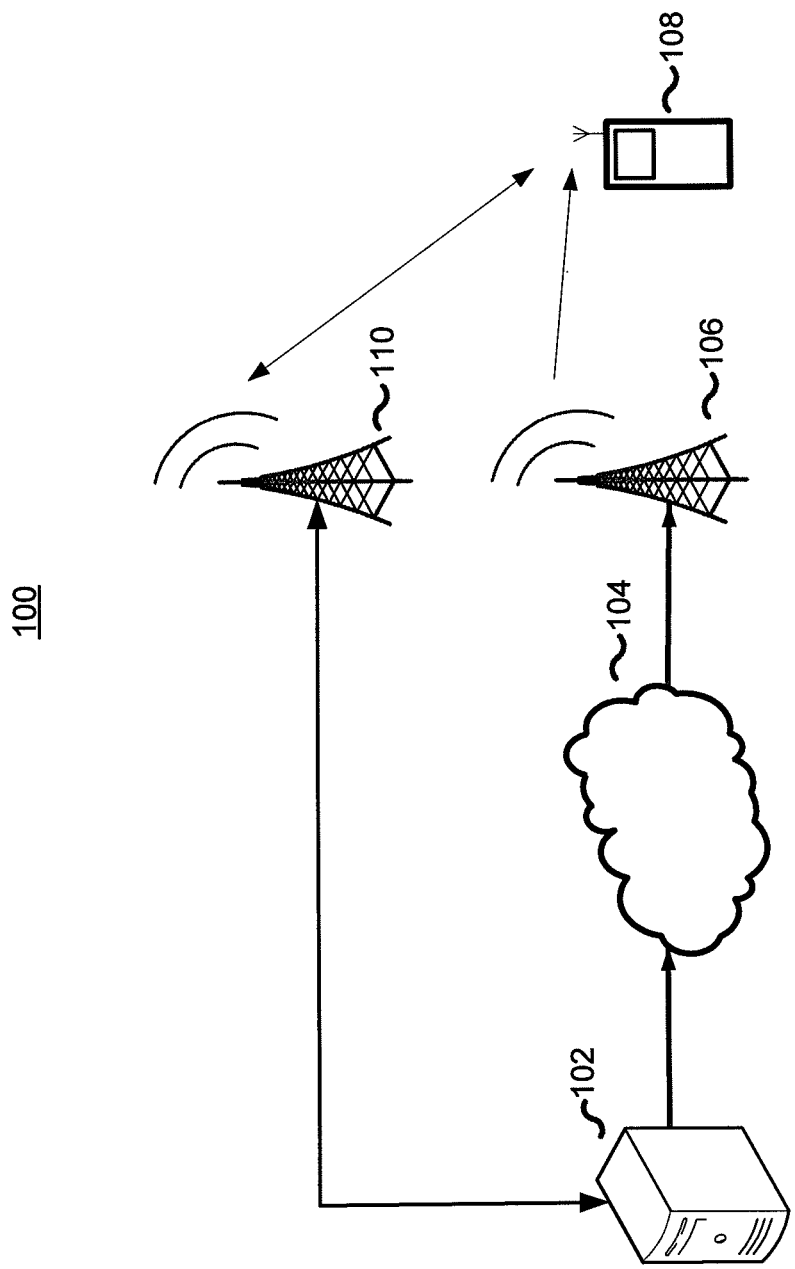
FIG. 1 illustrates a network computing environment suitable for carrying out one or more example embodiments of the invention.

FIG. 1 illustrates a network computing environment 100 suitable for carrying out one or more illustrative example embodiments of the invention. The network computing environment 100 may include a provider server 102 communicatively coupled to a network 104. The network 104 may be communicatively coupled to a broadcast station 106 that may communicate with a user terminal 108. For instance, the user terminal 108 may receive data wirelessly communicated from the broadcast station 106, such as, for example, via a cellular telecommunication network or a wireless local area network (WLAN). Also, the network computing environment 100 may provide for a wired connection between the provider server 102 and the user terminal 108. The network computing environment 100 also may include a wireless or wired backchannel via broadcast station 106 or through backchannel station 110. The provider server 102 may use the backchannel to exchange information with the user terminal 108. For instance, the provider server 102 may communicate a category guide, as described in further detail below, to the user terminal 108. Moreover, the user terminal 108 may communicate a subscription request that requests a subscription to an Internet information broadcasting service.

The provider server 102 and the user terminal 108 may employ Internet Protocol (IP) datacasting protocols, such as, but not limited to, Digital Video Broadcast (DVB), DVB-Handheld (DVB-H), Digital Multimedia Broadcasting (DMB), Media FLO (Forward Link Only), or Multimedia Broadcast Multicast Service (MBMS), and/or the like. For instance, the provider server 102 may communicate with the user terminal 108 via one or more channels. The provider server 102 may cause the Internet information to be broadcast as a packet stream on a specific channel or frequency. For example, the network computing environment 100 may provide an announcement channel and a broadcast channel. The provider server 102 may communicate control data over the announcement channel and Internet information over the broadcast channel. The announcement channel and the broadcast channel may be separate time slots in a time slotted transmission scheme, may be assigned separate frequencies in a frequency division transmission scheme, or may be assigned separate codes in a code based transmission scheme, or may use other suitable manners to separate the channels. Also, the announcement channel may be provided over the backchannel. To receive the transmissions, the user terminal 108 may lock itself on a specific broadcast channel and/or data stream to receive the broadcast Internet information and the category guide.

It is noted that although only a single instance of each device is depicted in FIG. 1, the network computing environment 100 may include one or more of each of these devices. Moreover, the functions performed by each of the devices illustrated in FIG. 1 may be split into additional devices or the illustrated devices may be combined with one another. Further, the network computing environment 100 may also be included in other systems (not shown) or may include additional devices.

Figure 2:
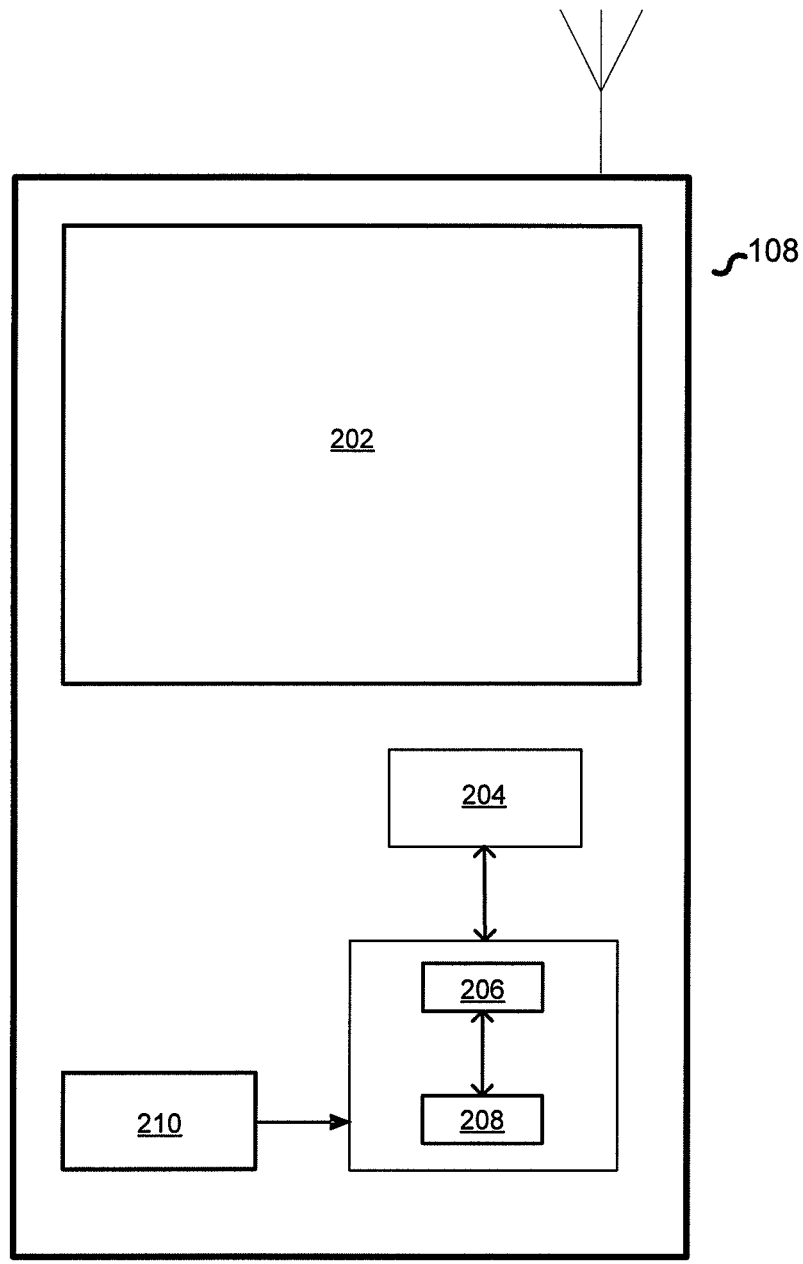
FIG. 2 illustrates architecture of a user terminal suitable for carrying out one or more example embodiments of the invention.

FIG. 2 illustrates a user terminal 108 suitable for carrying out one or more illustrative example embodiments of the invention. The user terminal 108 may be a mobile communication device, a mobile phone, or a mobile computer, as illustrated, or may also be a digital video recorder (DVR), a set-top box (STB), a server computer, a computer, a hard disc, an Internet browser device, a gaming device, an audio/video player, a digital camera/camcorder, a television, a radio broadcast receiver, a positioning device, a wired or wireless communication device, and/or any combination thereof.

In the depicted example, the user terminal 108 includes display 202, transceiver 204, processor 206, memory 208 or other computer readable media and/or other storage, and user interface 210. The user interface 210 may include a keypad, touch screen, voice interface, four arrow keys, joy-stick, data glove, mouse, roller ball, touch screen, or other suitable device for receiving input from a user to control the user terminal 108.

Computer executable instructions and data used by processor 206 and other components within user terminal 108 may be stored in the memory 208 in order to carry out any of the method steps and functions described herein. The memory 208 may be implemented with any combination of read only memory modules or random access memory modules, optionally including both volatile and nonvolatile memory. Also, some or all of user terminal 108 computer executable instructions may be embodied in hardware or firmware (not shown).

The user terminal 108 may be configured to receive, decode, and process broadcast Internet information transmissions from the broadcast station 106 at the transceiver 204. It is noted that the transceiver 204 may include one or more transceivers, such as one capable of receiving the broadcast Internet information over a broadcast channel and another capable of communicating over the backchannel. The user terminal 108 may have a web browser to launch a software program for processing the received broadcast Internet information transmissions and for generating instructions for communicating via the backchannel. The web browser may be any suitable web browser, such as, but not limited to, Mozilla Firefox, Internet Explorer, Google Chrome, or other programs for interfacing the user terminal 108 with the Internet.

In an example, the user terminal 108 may be configured to receive, decode, and process transmission based on one or more of the Digital Video Broadcast (DVB) standards, such as DVB-H or DVB-MHP, DVB-Satellite (DVB-S), DVB-Terrestrial (DVB-T) or DVB-Cable (DVB-C). Similarly, other digital transmission formats may be used to deliver content and information, such as, but not limited to, Advanced Television Systems Committee (ATSC), National Television System Committee (NTSC), Integrated Services Digital Broadcasting-Terrestrial (ISDB-T), Digital Audio Broadcasting (DAB), DMB, MediaFLO, MBMS, DIRECTV, and/or the like. Also other digital transmission formats may be used to deliver content and information, such as, but not limited to, Global System for Mobile Communications (GSM), 3G, Universal Mobile Telecommunications System (UMTS), Wideband Code Division Multiple Access (WCDMA), CDMA2000, 4G, Long Term Evolution (LTE), and/or the like. Further, the user terminal 108 also may be configured to receive, decode and process other types of transmissions, such as, but not limited to, FM/AM Radio transmissions, WLAN transmissions, or transmissions using other wired and wireless protocols and/or the like. In one aspect of the invention, the user terminal 108 may receive radio data stream (RDS) messages.

The broadcast Internet information transmission also may be time sliced, such as in DVB-H technology. Time-slicing may reduce the average power consumption of the user terminal 108 and may enable smooth and seamless handover. Time-slicing may comprise sending data in bursts using a higher instantaneous bit rate as compared to the bit rate required if the data were transmitted using a traditional streaming mechanism. In this case, the user terminal 108 may have one or more buffer memories for storing the decoded time sliced transmission before presentation.

Referring again to FIG. 1, the provider server 102 may process the Internet information to determine which is the most popular. Popularity, for example, may be based on the number of different devices, including user terminals 108, personal computers, etc., that have accessed particular Internet information. For instance, the user terminal 108 may communicate to the provider server 108 statistics on Internet information use and categories of interest to the user through the wireless backchannel. Devices other than the user terminals 108 also may provide statistics on Internet information use and categories of interest to the user to the provider server 102. Based on the popularity information, the provider server 102 may categorize the Internet information into categories and may broadcast the Internet information to the user terminal 108 by one or more categories. Alternatively, the provider server 102 may categorize the Internet information into categories based on information received from content providers or based on a category hierarchy generated by the provider server 102 without determining which of the Internet information is the most popular. Also, the provider server 102 may search the Internet based on keywords or metatags to create the categories. Popularity may be one way to identify Internet information suitable for broadcast to many user terminals. The provider server 102 also may select Internet information that is static and changes relatively infrequently and would be suitable for simultaneous broadcast to a large group of user terminals 108. To obtain Internet information that is interactive and/or is of interest to a limited number of users, the user terminal 108 may communicate with the provider server 102 via the backchannel to directly access such Internet information.

The categories may be different types of genres, services, specific or general links, any combination thereof, and/or the like. The categories also may classify the Internet information in other manners. Examples of genres are sports, news, and music. Examples of different services include a web-based service, such as social networking websites Facebook, Myspace, and Flickr. A specific link may be an URL that has specific memory requirement information for content available through that link, whereas a general link may be a link without memory requirement information. Examples of specific links are links on a particular web page, such as a "my favorites" link, my friends in Facebook, or myfriends in Flickr. Categorizing Internet information by the provider server 102 is further described below with reference to FIG. 3.

Figure 3:
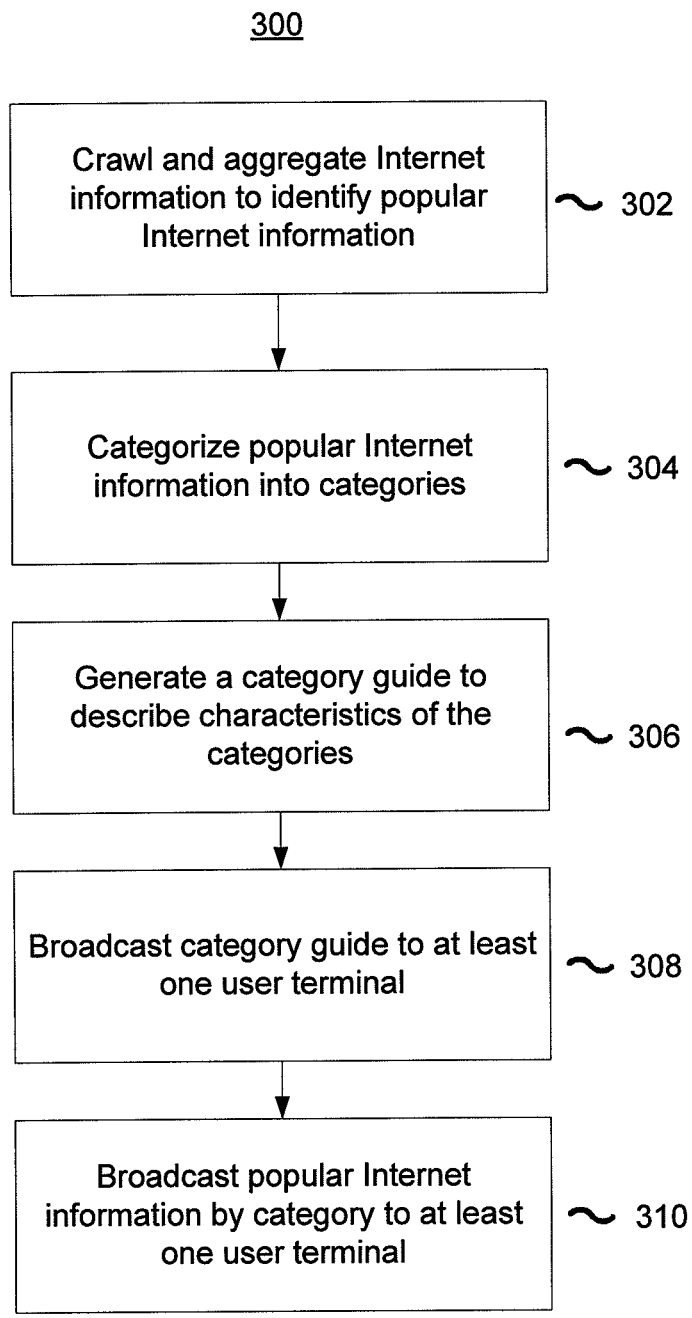
FIG. 3 illustrates a method performed by a provider server suitable for carrying out one or more example embodiments of the invention.

FIG. 3 illustrates a method 300 performed by the provider server 102 suitable for carrying out one or more illustrative example embodiments of the invention. In block 302, the provider server 102 may include specific programs (e.g., software, firmware, hardware) to crawl and aggregate Internet information for broadcasting to the user terminal 108. For instance, the Internet information may be one or more webpages, audio and/or video files, image files, game files, multimedia presentations, maps, program files, content files, other information, any combination thereof, and/or the like.

In block 304, the provider server 102 may organize the Internet information into categories. To categorize the Internet information, the provider server 102 may generate a description for each of the categories that can be communicated to the user terminal 108 prior to broadcasting Internet information. The description may include a name of each of the categories of Internet information to be broadcasted, the total size or memory need of the Internet information included in each category, the different types of Internet information in each category, and the start time, the end time and/or time interval indicating when a particular category is being broadcast. For example, the provider server 102 may construct the description using eXtensible Markup Language (XML) and may include a document type definition (DTD) document associated with each category. An example of the DTD document for a particular category may be:

```
<!-- Root element -->
<!ELEMENT Description (TNumber, Tsize, Category+)>
<!ELEMENT TNumber (#PCDATA)>
<!ELEMENT Tsize (#PCDATA)>
<!ELEMENT Category (Identifier, Name, CDescription,
LayerNumber, RelationLayer, TSize, AmountofPage, StartTime,
EndTime, DurationFromNow)>
    <!ELEMENT Identifier (#PCDATA)>
    <!ELEMENT Name (#CDATA)>
    <!ELEMENT CDescription (#CDATA)>
    <!ELEMENT LayerNumber (#PCDATA)>
    <!ELEMENT RelationLayer (FatherLayer, SonLayer)>
    <!ELEMENT FatherLayer (EMPTY|#CDATA)*>
    <!ELEMENT SonLayer (EMPTY|#CDATA)*>
    <!ELEMENT TSize (#PCDATA)>
```

-continued

```
<!ELEMENT AmountofPage (#PCDATA)>
<!ELEMENT StartTime (#PCDATA)>
<!ELEMENT EndTime (#PCDATA)>
<!ELEMENT DurationFromNow (#PCDATA)>
<!--End of DTD -->
```

Referring again to FIG. 3, in block 306, the provider server 102 may generate a category guide including the description for each of the categories. The category guide may include the document type definition (DTD) document for each of the different categories. For example, the category guide may be an Electronic Service Guide (ESG). The provider server 102 also may periodically update the category guide and subsequently send an updated category guide to change, add, or delete the categories. In example embodiments, the memory requirements may be static during a time period T, and if the provider server 102 has identified new Internet information or new versions of Internet information, the category guide may be updated with the new memory requirements and broadcast to the user terminals 108.

In block 308, the provider server 102 may broadcast the category guide to at least one user terminal 108. For instance, the provider server 102 may communicate the category guide to the broadcast station 106 via the network 104, and the broadcast station 106 may wirelessly communicate the category guide to the user terminal 108. In one example, the server 102 may repeatedly broadcast the category guide and Internet information during certain time intervals. Further, the category guide may include information to identify those time intervals and may indicate when the category guide is going to be broadcast and/or updated and when some specific Internet information and/or category will be broadcast. The category guide may also be transmitted via the backchannel station 110 over the wireless telecom back channel, as illustrated in FIG. 1.

In block 310, the provider server 102 may broadcast the Internet information by category to the at least one user terminal 108. The provider server 102 may broadcast the Internet information in accordance with the information included in the category guide. Moreover, the provider server 102 may encrypt the Internet information before broadcasting such that only user terminals 108 subscribing to a service for the broadcast Internet information are able to decode the broadcasts. The provider server 102 may also communicate a time identifier, a category identifier, and/or version identifier to identify the time at which the Internet information is being broadcast, to identify the category of the Internet information being transmitted, and/or to identify the version of the Internet information.

To handle the potentially large volume of Internet information being broadcast by the provider server 102, the user terminal 108 may efficiently allocate its memory 208 based on the interests of the user and/or the browsing history of the user. When the broadcast Internet information is received, the user terminal 108 may store Internet information of interest to the user in proportion to the interest of the user, and may discard Internet information that is not of interest to the user, as further described below.

Figure 4:
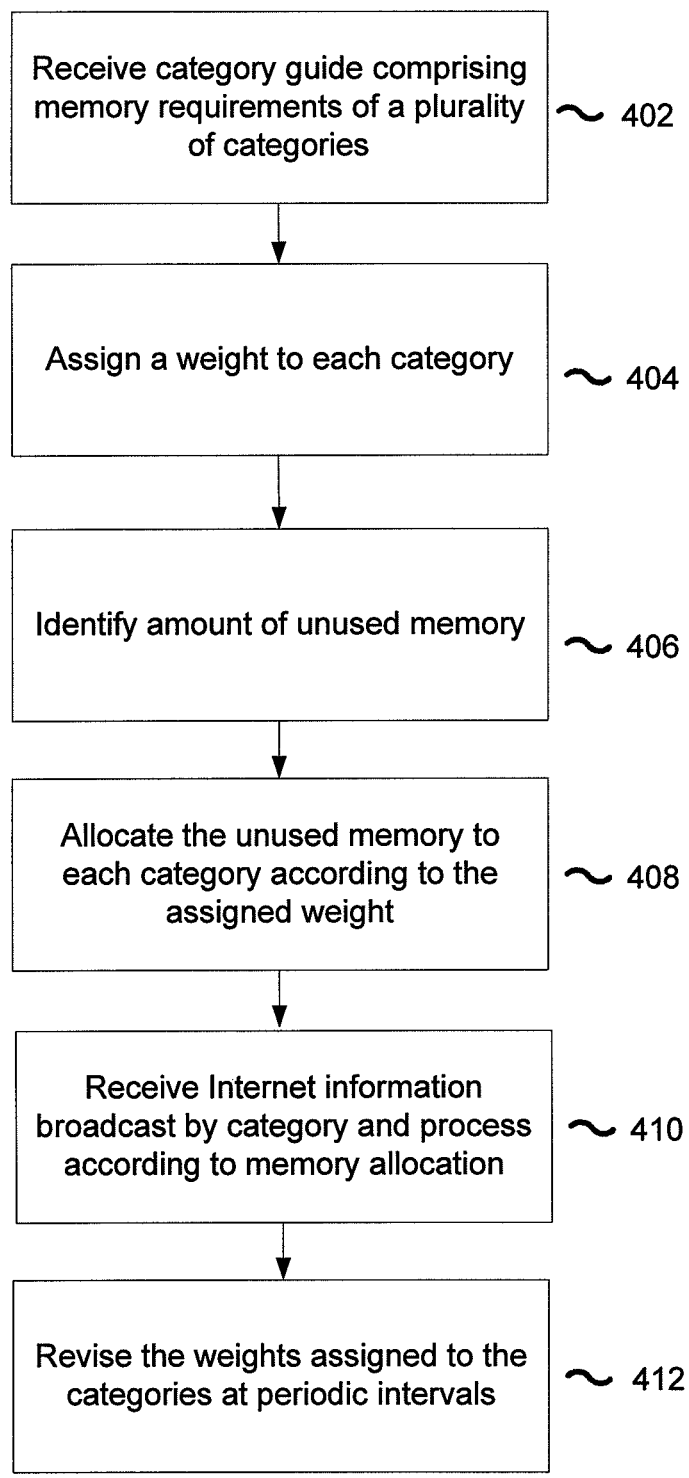
FIG. 4 illustrates a memory allocation method performed by a user terminal suitable for carrying out one or more example embodiments of the invention.

FIG. 4 illustrates a memory allocation method performed by the user terminal 108 suitable for carrying out one or more illustrative example embodiments of the invention. In block 402, the user terminal 108 may receive the category guide from the provider server 102. The user of the user terminal 108 may, for example, subscribe to an Internet formation broadcasting service by sending a subscription request to the provider server 102 via the wireless back channel and may receive decoding information, such as, but not limited to, a decryption code, Digital Rights Management (DRM) information, and/or the like, to decode the broadcast Internet information and the category guide. The user terminal 108 may execute a software application, for instance, to process the received category guide and broadcast Internet information. Through processing the DTD document of the category guide, the user terminal 108 can display to the user at the display 202 all of the categories of Internet information to be broadcast. In an example, the category guide may include the DTD document that identifies the memory requirements for each of the categories to be broadcast.

In block 404, the user terminal 108 may assign a weight to each category. The weight may be assigned based on interests of the user and/or based on the browsing history of the user. In various embodiments, the user terminal 108 may: (1) assign weights based only on the interests of the user, (2) the user terminal 108 may assign weights based on the interests of the user, and may modify the assigned weights based on the browsing history of the user, or (3) may assign weights based only on the browsing history of the user. The browsing history, for example, may identify particular web pages that the user terminal 108 has accessed within a certain time period. To assign weights to the categories based on interests of the user, the user terminal 108 may prompt the user to enter preference inputs selecting categories of interest.

Figure 5:
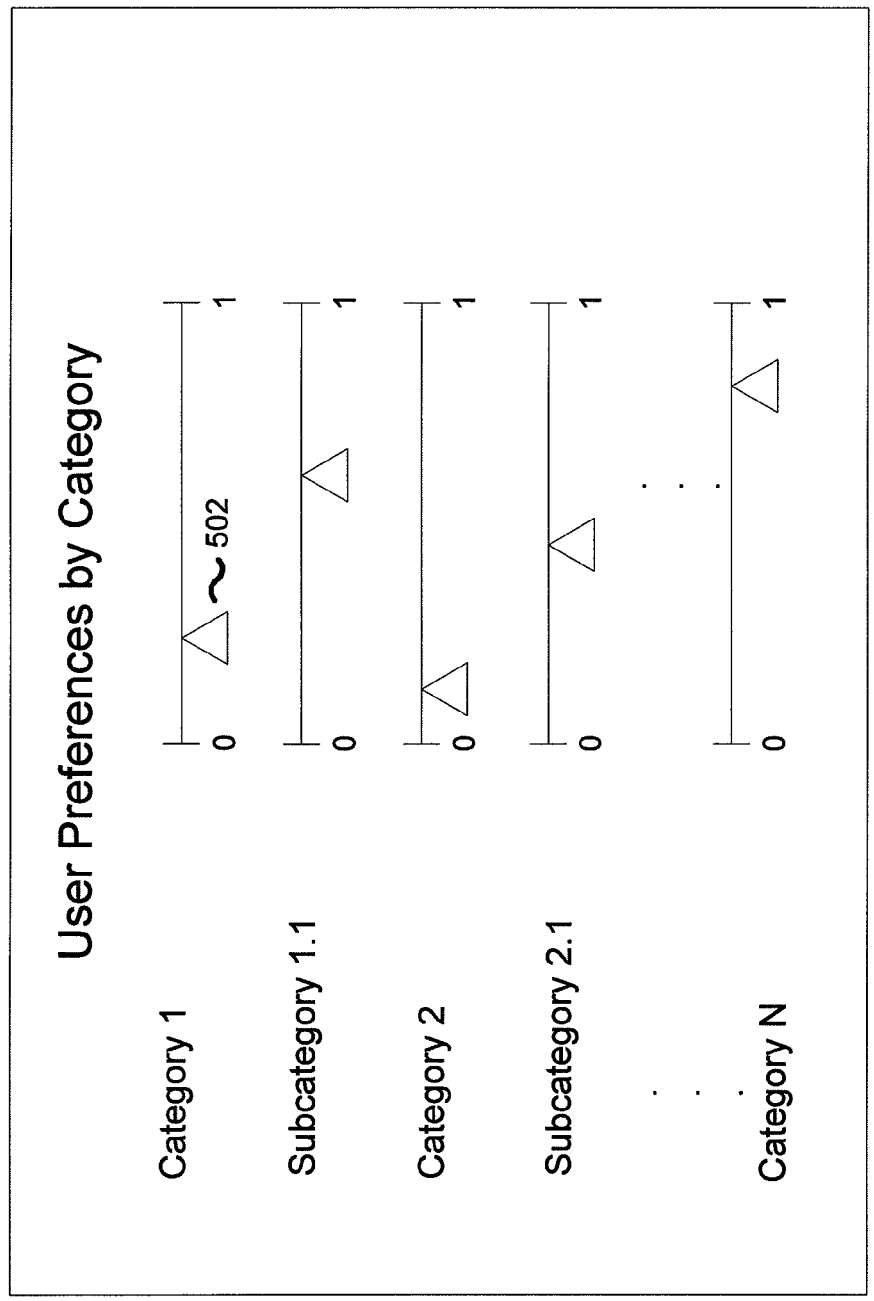
FIG. 5 illustrates an example of a user interface displayed to a user by a user terminal in accordance with one or more example embodiments of the invention.

FIG. 5 illustrates an example of a user interface displayed to the user by the user terminal 108 in accordance with one or more illustrative example embodiments of the invention. The user terminal 108 may process the category guide to display the available categories and subcategories, and the user may indicate his or her preference for each. Every category also may include text (not shown) describing each category to help the user understand the content of each category. As illustrated, the user interface includes category 1, subcategory 1.1, category 2, subcategory 2.1, . . . , and category N. If the user selects a category (e.g., snow skiing) to indicate that the user is interested in that category, the user terminal 108 can assign the weight of this category to 1. If a user does not select a category, thus indicating no interest in the category, the user terminal 108 may assign a weight of 0 to the category to indicate strength of the user's preference. Also, the user may assign a weight between 0 and 1 by adjusting the indicator 502. The weight of each category may indicate a fondness degree the user has for a particular category.

The weights of each category can also be assigned according to the browsing history of user with or without prompting the user for his or her interests. For instance, the user terminal 108 may monitor the user's Internet browsing behavior on direct access Internet browsing over a two-way network connection and/or on the broadcast Internet information, or in other ways. Direct access Internet browsing may refer to Internet information that the user terminal 108 directly accesses, such as, for example, through a user typing a URL into an address bar of a browser that returns the requested webpage or through a user entering keywords into an Internet search engine and selecting Internet information of interest from the results returned by the Internet search engine.

To assign a weight to a category, the user terminal 108 may identify various browsing history factors during a time period T. The browsing history factors may include, but are not limited to: (1) the amount of Internet information (e.g., web pages) in a category that has been opened by the user at the user terminal, (2) the proportion of different Internet information that has been opened within a particular category, (3) the browsing speed of Internet information in a category compared with the user's average browsing speed, and so on. For example, over time period T, if the user has caused the user terminal 108 to open Internet information in a particular category many times, the user terminal 108 may infer that the user is very interested in the category. Likewise, if the proportion of Internet information opened in a category during period T is high (e.g., user has viewed 7 of 10 web pages in a category), the user terminal 108 may infer that the user is very interested in the category. Conversely, if the Internet information in a category has been opened infrequently or not at all during time period T, the user terminal 108 may infer that the user is not very interested in the category. Similarly, if the proportion of unopened Internet information in the category during period T is high, the user terminal 108 may infer that the user is not very interested in the category.

Additionally, every user has a natural web page browsing speed, which can be deduced from the amount of time a user spends browsing particular Internet information (e.g., the amount of time a web page is displayed to a user). If Internet information is browsed at a speed faster than an average browsing speed of the user, the user terminal 108 may conclude that the user is not very interested in this Internet information. In contrast, if Internet information is browsed at a speed slower than the average browsing speed of the user, the user terminal 108 may conclude that the user is interested in this Internet information. The user terminal 108 may also monitor periods of user inactivity, such as when the user has stopped using the user terminal 108, to prevent the user terminal 108 from determining that the user is very interested Internet information of a category when in actuality the user has stopped using the user terminal 108 and left open the Internet information of a certain category. The following gives an example of the user terminal 108 assigning a weight to categories based on the browsing history factors described above.

Initially, the user terminal 108 may determine whether the user has input his or her interests in the categories, such as that described above with reference with FIG. 5, to assign initial weights to each of the categories. If weights have previously been assigned, the user terminal 108 may adjust the weights based on the browsing history of the user as described below, or may proceed to block 406 without modifying the weights. If no weights have been previously assigned to one or more categories, the user terminal 108 may assign each of the weights an initial value (e.g., zero) and the user terminal 108 may adjust the initial value of the weights based on the browsing history of the user.

To assign initial weights based on the user's browsing history, the user terminal 108 may assign a numerical value as a weight to each category that depends on the number of times a user has opened Internet information in a category, how much of the Internet information the user has browsed within a category (e.g., number of web pages viewed when compared with the total number of web pages in a category), the speed the user browses through Internet information in a category, and/or any combination thereof. If the number of times a user opens Internet information in a particular category is greater when compared with the average number of times a user opens Internet information in other categories, the user terminal 108 may add a larger value to increase the weight of the category. Additionally, if the user terminal 108 determines that a user has browsed a larger amount of Internet information in a category when compared with the average amount of Internet information viewed in the other categories, the user terminal 108 may add a larger value to the weight for that category. Furthermore, if the user terminal 108 determines that a user has browsed Internet information in a category for a longer amount of time when compared with the average amount of time spent browsing Internet information in other categories, the user terminal 108 may add a larger value to the weight for that category.

Conversely, if the number of times a user opens Internet information in a particular category is less when compared with the average number of times a user opens Internet information in other categories, the user terminal 108 may add a smaller value to the weight of the category. Also, if the user terminal 108 determines that a user has browsed less of the Internet information in a category when compared with the average amount of Internet information viewed in other categories, the user terminal 108 may add a smaller value to the weight for that category. Moreover, if the user terminal 108 determines that a user has browsed Internet information in a category for a shorter amount of time when compared with the average amount of time spent browsing Internet information in other categories, the user terminal 108 may add a smaller value to the weight for that category.

In the following example, the user terminal 108 may add added value $A\_V_i$ to the weight $W_i$ of category i in accordance with the following equation:

$$A\_V_i = \frac{Value_{Times\_Category\_i}}{Value_{Times\_All\_Categories}} \times \frac{Number_{Open\_IntInfo\_i}}{Number_{IntoInfo\_All\_i}} \times \frac{Number_{Interested\_IntInfo\_i}}{Number_{open\_IntInfo\_i}}, \quad (1)$$

where $Value_{Times\_Category\_i}$ is the number of times category i was opened in period T, and $Value_{Times\_All\_Categories}$ is the total number of times Internet Information was opened in any of the categories in period T. $Number_{open\_IntInfo\_i}$ is the number of different types of Internet information that was opened in category i in period T, and $Number_{IntInfo\_All\_i}$ is the total number of the different types of Internet information in category i. $Number_{interested\_IntInfo\_i}$ is the total number of the different types of Internet information in the category i that the user was interested in time period T (e.g., Internet information whose browsing speed was slower than the average browsing speed), and $Number_{open\_IntInfo\_i}$ is the number of the different types of Internet information opened in the category i during time period T. Other equations also may be used to express a relationship between these factors.

Optionally, the user terminal 108 may include a threshold comparison before adjusting the weight of a category. For example, the user terminal 108 may compare the added value $A\_V_i$ to a threshold α and may adjust the weight $W_i$ of category i by $A\_V_i$ if the added value $A\_V_i$ in equation (1) is greater than threshold α. Otherwise, if added value $A\_V_i$ is less than the threshold α, the user terminal 108 may retain the previously assigned weight $W_i$ of category i without adding the added value $A\_V_i$.

In another example, the user terminal 108 may adjust the weight $W_i$ of category i by a specific increment Δ instead of by $A\_V_i$ either with or without a comparison with threshold α. If the threshold α is used, the user terminal 108 may adjust the weight $W_i$ of category i by a specific increment Δ if added value $A\_V_i$ is greater than threshold α. The value of Δ and α can be preset according to the actual needs. In an example, the range for Δ and α may be on the same order of magnitude with the original value of weight of a category. If the weight $W_i$ of category i is reduced, the memory space allocated to category i will become smaller, thus permitting less Internet information (e.g., less web pages) of that category to be stored.

Referring again to FIG. 4, in block 406, the user terminal 108 may identify the amount of unused memory. For example, the processor 206 may query the memory 208 to determine the amount of unused space. In various examples, the available memory size can be fixed or dynamic. For a dynamic memory size, the memory 208 may estimate the amount of unused space based on memory usage history information and may communicate the estimate to the processor 206. In an example, if a user inputs feedback at the user terminal 108 indicating Internet information of interest is satisfactorily being stored, the memory 208 may reduce the estimate of the amount of unused memory space. If the user inputs feedback at the user terminal 108 indicating that Internet information is not being received and/or the processor 206 indicates that Internet information of interest is not going to be broadcast in a future time period according to the category guide, the memory 208 may increase the estimate of the amount of unused memory space. For a fixed memory size, the memory 208 may identify the total amount of unused space and may communicate the total amount or some lesser proportion thereof to the processor 206.

In block 408, the user terminal 108 may allocate the unused memory to each category according to the assigned weight. The user terminal 108 may allocate memory space in accordance with either equation set forth below or others:

$$M_i = \frac{W_i}{\sum_{i=1}^{N_{s\_c}} W_i} \times M_{Total}, \text{ or} \quad (2)$$

$$M_i = \beta \times \frac{S_i}{\sum_{i=1}^{N_{s\_c}} S_i} \times M_{Total} + (1-\beta) \frac{W_i}{\sum_{i=1}^{N_{s\_c}} W_i} \times M_{Total}, \quad (3)$$

where $N_{s\_c}$ is the total number of categories selected by user or the total number of categories have been assigned a weight by examining the user's browsing history, $M_{Total}$ is the free memory space, $W_i$ is the weight assigned to the ith category, where i=1, 2, ... $N_{s\_c}$, and $S_i$ is the size (e.g., 2000 MB) of all of the Internet information included in the ith category. Equation (2) allocates memory space based on the weight assigned to a particular category. Equation (3) allocates the memory space of every selected category based on two factors: the weight assigned to the category and the amount of Internet information in the category. β represents the different influence of the two factors for the allocating memory space. The value of β can be determined according to the actual needs. If β=0, equation (3) is the same as (2). As such, the user terminal 108 may allocate a memory size to every category based on the information on memory requirements received in the category guide, the weight assigned to the category, and the available memory size. FIG. 6 illustrates an example of memory allocation for a user terminal to illustrate one or more example embodiments of the invention.

Referring again to FIG. 4, in block 410, the user terminal 108 may receive and process the broadcast Internet information according to the memory allocation. For example, the processing by user terminal 108 may determine whether to keep or discard the received broadcast Internet information based on the memory allocation. The user terminal 108 may determine whether to store the received broadcast Internet information based on the time, category, and/or version identifiers included in the broadcast Internet information. The time identifier may indicate a start time (e.g., time when the provider server 102 will begin broadcasting Internet information of the category, such as 8:00 PM), an end time, time interval, and/or Durationfromnow data. As described above, the category guide can include the start time and end time for category. Additionally, the Durationfromnow data in the category guide avoids time desynchrony between provider server 102 and user terminal 108. Desynchorony may occur when the clocks of the user terminal 108 and the provider server 102 differ. For instance, if the clock of the user terminal 108 indicates that the current time is 8:00 PM, and the clock of the provider server 102 indicates that the current time is 8:10 PM, time desynchrony may occur. The Durationfromnow data is relative value indicating that the Internet information of a particular category will be broadcast after a certain amount of time (e.g., thirty minutes from now). The user terminal 108 may process the Durationfromnow data to determine when a desired category is being broadcast and may store the received broadcast Internet information at that time in the memory space allocated to that category.

The user terminal 108 can also process the category identifier included in the broadcast Internet information to determine when to begin storing the broadcast Internet information received at the transceiver 204. As discussed above, the provider server 102 may add a unique category identifier to the Internet information being broadcast. The user terminal 108 may process the category identifier to determine whether to keep or discard the received Internet information. If the user terminal 108 has enough allocated space in the memory 208 for the category being broadcast, the user terminal 108 may store the received Internet information at the location in the memory 208 allocated to that category. If the user terminal 108 has not allocated space in the memory 208 for the received category of Internet information, then the user terminal 108 may discard the received Internet information. In one example, the broadcast Internet information may be received by a lower layer. The application layer of the user terminal 108 may determine whether keep or discard the received broadcast Internet information according to the unique identifier of category.

When the user terminal 108 allocates less memory than the size of a category, a secondary weight may be assigned to every discrete portion of Internet information in a category (e.g., a webpage in a category including ten webpages) based on importance or popularity. The secondary weight can be assigned by the provider server 102 after crawling and parsing the Internet information and/or can be assigned based on information input by the user prioritizing subcategories within a category. If two or more types of Internet information have the same secondary weight and there is not enough memory space, processor 104 may use an arbitrary metric, such as the publication time of the Internet information to determine which to keep and which to discard.

Referring to FIG. 4, in block 412, the user terminal 108 may revise the weights assigned to the categories at periodic intervals based on the browsing history of the user in the latest time period T. The revisions may occur as described above in block 408. For instance, the user terminal 108 may evaluate the browsing history of the user within the last T seconds, minutes, hours, days, etc., and may recalculate the added value $A\_V_i$ for each of the categories to adjust their respective weights $W_i$. Similar to the description above, the user terminal 108 may optionally limit adjustments of the respective weights $W_i$ to instances when the added value $A\_V_i$ is greater than threshold α. If the amount of memory for a particular category has been reduced from that previously allocated, the memory 208 may write over the previously allocated memory. To determine which Internet information to overwrite, the memory 208 may write over the Internet information having the oldest publication time, the Internet information that was the least accessed by the user, or in other suitable manners. As such, the above description provides an improved way of allocating memory in a user terminal.

Accordingly, a tremendous volume of Internet information can be broadcast, but the memory space of a user terminal may be limited. Example embodiments of the invention efficiently allocate the memory space of a user terminal and selectively store broadcast Internet information based on user interest and/or user browsing history without involving the user terminal providing feedback to the provider server.

Internet information can be identified and organized into categories, such as an entertainment category, a sports category, etc. The Internet information may include Internet web pages, for example. Before being broadcast, a category guide may be communicated to one or more user terminals to identify the types of categories to be broadcast, the size (e.g., 2000 MB) of the Internet information included in each category, the number of different types of Internet information in each category, and so on. The user terminal may use the category guide in allocating its memory and in determining when to retain broadcast Internet information of interest to the user.

To efficiently allocate its memory, the user terminal may receive selections of categories of interest from a user and/or analyze browsing history of a user in each of the categories. The user terminal may assign each category a weight, which can represent the fondness degree of the user for the category, and may allocate memory space based on the weight. The user terminal also may adjust the weight assigned to a category according to subsequent user browsing behavior. The browsing history of the user terminal may identify the types of Internet information of interest to the user by category (e.g., sports, movies, etc.). The description provided below describes various example embodiments of categorizing Internet information for broadcasting by category and allocating the memory space of a user terminal in accordance with example embodiments of the present invention.

The foregoing description was provided with respect to adjusting memory allocation of a user terminal in a network computing environment. It is understood that the principles described herein may be extended to network computing environments that are wired, wireless, or both.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer readable media storing computer-executable instructions that, when executed by a processor, cause the processor to perform a method comprising the steps of:
monitoring Internet browsing behavior of a plurality of user terminals within a plurality of categories;
aggregating the browsing behavior to produce a category guide, the category guide includes the plurality of categories; and
broadcasting the category guide to the plurality of user terminals, wherein the category guide includes memory requirement for the category guide.

2. The one or more non-transitory computer readable media of claim 1, further comprising the steps of:
receiving, from at least one user terminal of the plurality of user terminals, preference information; and
updating profile information for the at least one user terminal based on the preference information.

3. The one or more non-transitory computer readable media of claim 2, wherein the preference information includes memory allocation for the at least one user terminal.

4. The one or more non-transitory computer readable media of claim 2, wherein the step of aggregating the browsing behavior includes the steps of receiving from the at least one user terminal a weight, the weight being assigned to a selected category from the plurality of categories by the at least one user terminal.

5. The one or more non-transitory computer readable media of claim 1, wherein the step of monitoring includes monitoring at least one user terminal's direct access to a category of the plurality of categories.

6. The one or more non-transitory computer readable media of claim 1, wherein the category guide includes information about timing of the broadcast to the plurality of user terminals.

7. A method comprising the steps of:
monitoring a plurality of user terminals' browsing behavior among a plurality of categories to generate a category guide, the category guide representing an aggregation of weights received from the plurality of user terminals, for a plurality of categories;
broadcasting the category guide to at least one user terminal selected from the plurality of terminals;
receiving an update from the at least one user terminal; and
updating the category guide based on the update received.

* * * * *